United States Patent
Weßkamp

(10) Patent No.: US 11,956,358 B2
(45) Date of Patent: Apr. 9, 2024

(54) METHOD FOR SYNCHRONIZING A RECEIVER INITIALIZATION VECTOR WITH A TRANSMITTER INITIALIZATION VECTOR

(71) Applicant: KROHNE Messtechnik GmbH, Duisburg (DE)

(72) Inventor: Patrick Weßkamp, Mülheim (DE)

(*) Notice: Subject to any disclaimer, the term of this patent is extended or adjusted under 35 U.S.C. 154(b) by 0 days.

(21) Appl. No.: 17/330,733

(22) Filed: May 26, 2021

(65) Prior Publication Data
US 2021/0377021 A1   Dec. 2, 2021

(30) Foreign Application Priority Data
May 26, 2020   (DE) .............. 10 2020 114 081.9

(51) Int. Cl.
*H04L 9/12*   (2006.01)
*H04L 9/06*   (2006.01)
(Continued)

(52) U.S. Cl.
CPC .............. *H04L 9/12* (2013.01); *H04L 9/0631* (2013.01); *H04L 9/0819* (2013.01);
(Continued)

(58) Field of Classification Search
CPC ..... H04L 9/12; H04L 9/0631; H04L 63/0435; H04L 9/0637; H04L 9/0819;
(Continued)

(56) References Cited

U.S. PATENT DOCUMENTS

| | | |
|---|---|---|
| 6,602,487 B1 | 8/2003 | Hermsmeyer |
| 6,697,490 B1 | 2/2004 | Mizikovsky et al. |

(Continued)

FOREIGN PATENT DOCUMENTS

| | | |
|---|---|---|
| DE | 10223217 A1 | 12/2003 |
| DE | 60028900 T2 | 11/2006 |
| DE | 102013218212 A1 | 3/2015 |

OTHER PUBLICATIONS

Wu, Teng, et al.; "The Weakness of Integrity Protection for LTE"; WiSec '13, Proceedings of the sixth ACM conference on Security and privacy in wireless and mobile networks; Budapest, Hungary; Apr. 17, 2013; 9 Pages.

*Primary Examiner* — Farid Homayounmehr
*Assistant Examiner* — Brian William Avery
(74) *Attorney, Agent, or Firm* — Patrick D. Duplessis

(57) ABSTRACT

A method for synchronizing transmitter and receiver initialization vectors includes: generating a key and providing the key to a transmitter and a receiver; initializing a transmitter initialization vector and a receiver initialization vector with an initialization vector; forming a transmitter partial counter from a counter of the transmitter initialization vector; encrypting a message using the key and the transmitter initialization vector; generating and transmitting a data packet containing the encrypted message and the transmitter partial counter; incrementing the counter; receiving a data packet with an encrypted message and the transmitter partial counter; extracting the transmitter partial counter from the data packet; forming a receiver partial counter from a counter of the receiver initialization vector; based on a comparison of the receiver partial counter and the transmitter partial counter, changing the counter of the receiver initialization vector; decrypting the message and incrementing the counter of the receiver initialization vector.

10 Claims, 1 Drawing Sheet

(51) Int. Cl.
*H04L 9/08* (2006.01)
*H04L 9/32* (2006.01)
*H04L 9/40* (2022.01)

(52) U.S. Cl.
CPC ........ *H04L 9/3242* (2013.01); *H04L 63/0435* (2013.01); *H04L 2209/805* (2013.01)

(58) Field of Classification Search
CPC ............ H04L 9/3242; H04L 2209/805; G06M 1/272; G06F 21/602; G06F 7/588
See application file for complete search history.

(56) References Cited

U.S. PATENT DOCUMENTS

| | | | |
|---|---|---|---|
| 2008/0043897 A1* | 2/2008 | Gara | H03K 23/54 377/20 |
| 2009/0262937 A1* | 10/2009 | Hirth | H04L 9/0891 380/256 |
| 2010/0299538 A1 | 11/2010 | Miller | |
| 2014/0254466 A1* | 9/2014 | Wurster | H04L 51/18 370/312 |
| 2018/0124180 A1* | 5/2018 | Banno | H04L 67/12 |

\* cited by examiner

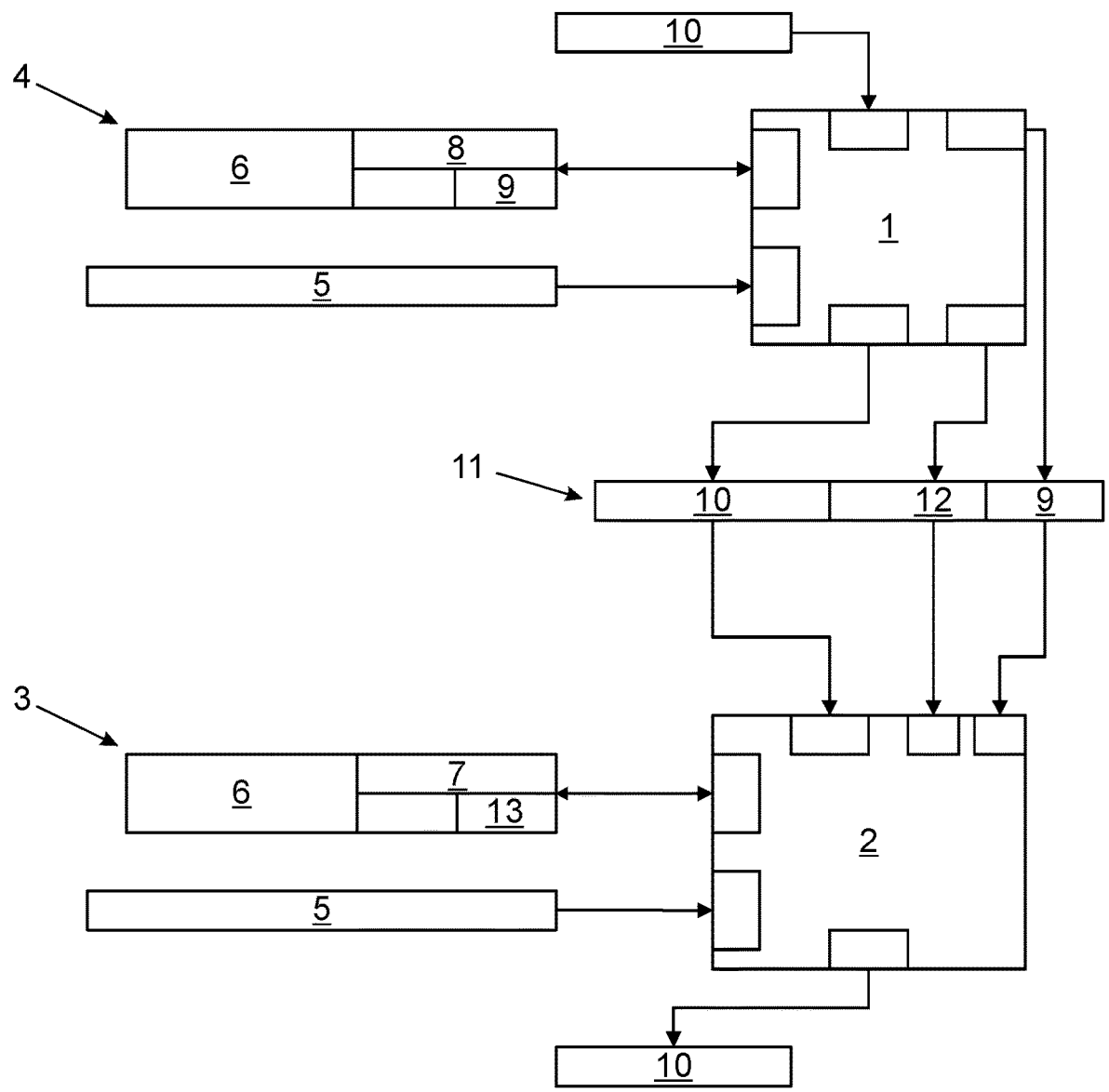

METHOD FOR SYNCHRONIZING A RECEIVER INITIALIZATION VECTOR WITH A TRANSMITTER INITIALIZATION VECTOR

TECHNICAL FIELD

The invention relates to a method for synchronizing a receiver initialization vector of a receiver with a transmitter initialization vector of a transmitter during continuous transmission of encrypted data packets from the transmitter to the receiver.

BACKGROUND

For this, on the one hand, a key and, on the other hand, an initialization vector with a counter of N bits are generated. The initialization vector thus has a counter with N bits. The counter is thus an N-bit counter. N is an integer greater than zero.

The key is provided to the transmitter and the receiver and the transmitter initialization vector and the receiver initialization vector are initialized with the initialization vector. In particular, this means that the transmitter initialization vector has a transmitter counter, and the receiver initialization vector has a receiver counter according to the counter of the initialization vector. Initially, the transmitter initialization vector and the receiver initialization vector have the value of the initialization vector.

In the prior art, the following steps are performed by the transmitter each time a data packet is transmitted:
  A message is encrypted according to an encryption method using the key and the transmitter initialization vector to ensure confidentiality.
  A data packet is generated and sent with the encrypted message and the transmitter counter.
  Then, the transmitter counter of the transmitter initialization vector is incremented.

The following steps are performed by the receiver each time a data packet is transmitted in the prior art:
  A data packet containing a message and a transmitter counter is received.
  The transmitter counter is extracted from the data packet.
  The receiver counter is updated with the transmitter counter.
  The message is decrypted according to the encryption procedure using the key and the receiver initialization vector.

Continuous transmission is performed in that the transmitter and the receiver perform the above steps continuously. A transmission includes transmitting and receiving.

Since the transmitter and the receiver use the same key, the encryption method is a symmetric encryption method. The key must be secret to ensure confidentiality, whereas the counter may be known. Thus, the unencrypted transmission of a counter does not compromise the confidentiality of a message that has been encrypted using the counter.

A message is to be encrypted using a unique combination of the key and the transmitter initialization vector to ensure confidentiality. Uniqueness of the combination is ensured by incrementing the transmitter counter in the transmitter initialization vector as described after each encryption of a message.

Successful decryption of a message requires that the receiver initialization vector is equal to the transmitter initialization vector. This is the case if the receiver counter is equal to the transmitter counter used to encrypt the message, since any other components of the receiver and transmitter initialization vectors are constant. That the transmitter and receiver counters are equal is ensured by sending the transmitter counter together with the encrypted message in a data packet and updating the receiver counter with the transmitter counter. In this way, the receiver initialization vector is synchronized with the transmitter initialization vector in the prior art.

However, the method known from the prior art has disadvantages. On the one hand, transmitting the transmitter counter with each data packet increases the size of the data packet and, on the other hand, increases the energy required to transmit the data packet.

SUMMARY

Therefore, an object of the present invention is to provide a method for continuously synchronizing the receiver initialization vector with the transmitter initialization vector, in which the disadvantages described above are at least mitigated.

The object is achieved by a method according to the features disclosed herein. The method modifies the method known from the prior art, as described below.

The following steps are performed by the transmitter each time a data packet is transmitted:
  A transmitter partial counter is formed with the lowest value M bits less than N bits from the counter of the transmitter initialization vector, i.e., the transmitter counter. The transmitter partial counter is thus an M-bit counter. M is an integer greater than zero and less than N.
  A message is encrypted according to the encryption method using the key and the transmitter initialization vector to ensure confidentiality.
  A data packet is generated and transmitted with the encrypted message and the transmitter partial counter.
  Then the counter of the transmitter initialization vector is incremented.

The following steps are performed by the receiver each time a data packet is transmitted:
  A data packet containing an encrypted message and a transmitter partial counter is received.
  The transmitter partial counter is extracted from the data packet.
  A receiver partial counter with the lowest value M bits less than N bits is formed from the counter of the receiver initialization vector, i.e., the receiver counter.
  A comparison is made between the receiver partial counter and the transmitter partial counter. Accordingly, the values from the receiver and transmitter partial counters are compared during this comparison.
  If the comparison results in a higher transmitter partial counter than receiver partial counter, the lowest value M bits of the counter of the receiver initialization vector are replaced by the transmitter partial counter. This comparison result is also referred to as comparison result A in the following.
  If the comparison results in a lower transmitter partial counter than receiver partial counter, the lowest value M bits of the counter of the receiver initialization vector are replaced by the transmitter partial counter and the value of the counter of the receiver initialization vector is then increased by $2^M$. This comparison result is also referred to as comparison result B in the following.

Thereafter, the message is decrypted according to the encryption procedure using the key and the receiver initialization vector and then the counter of the receiver initialization vector is incremented.

In addition to a higher (comparison result A) and lower (comparison result B) transmitter partial counter than receiver partial counter, the third possible result of the comparison is that the transmitter and receiver partial counters are equal. This comparison result is also referred to as comparison result C in the following and, in contrast to comparison results A and B, does not require any further steps because the receiver counter already has the correct value.

The table below shows an example of a continuous transmission of data packets from the transmitter to the receiver for a counter with N=16 bits, which is why the transmitter and receiver counters are also 16-bit counters each, and with M=8 bits, which is why the transmitter and receiver partial counters are both 8-bit counters. Numbers ending with a subscript "b" are binary numbers and numbers ending with a subscript "d" are decimal numbers. Each data packet received by the receiver is successfully decoded in the example. A transmission of a data packet is successful when it is not only sent but also received.

receiver. Therefore, the comparison is also not performed, and the transmitter counter is incremented but not the receiver counter.

The transmission is also not successful in line 4, which is why the same as in line 3 is executed.

In line 5 the transmission is successful. The transmitter counter has the value $513_d$ and the transmitter partial counter has the value $1_d$. Due to the two previous unsuccessful transmissions, the receiver counter has only the value $511_d$ and the receiver partial counter has the value $255_d$. This is why the comparison returns the comparison result B. Here, the receiver counter is synchronized with the transmitter counter by replacing the lowest value 8 bits of the receiver counter ($1111,1111_b$) with the transmitter partial counter ($0000,0001_b$) and then incrementing the receiver counter by $2^8{}_d=256_d$. After synchronization, the data packet is successfully decrypted. Finally, on the transmitter side, the transmitter counter is incremented. On the receiver side, the receiver counter is incremented because a data packet has been received.

The transmission is successful in line 6, which is why the same as in lines 1 and 2 is executed.

The transmission is not successful in line 7, which is why the same as in lines 3 and 4 is executed.

| Transmitter Counter | Transmitter Partial Counter | Transmission | Receiver Counter | Receiver Partial Counter | Comparison Result |
|---|---|---|---|---|---|
| $1,1111,1101_b = 509_d$ | $1111,1101_b = 253_d$ | successful | $1,1111,1101_b = 509_d$ | $1111,1101_b = 253_d$ | C |
| $1,1111,1110_b = 510_d$ | $1111,1110_b = 254_d$ | successful | $1,1111,1110_b = 510_d$ | $1111,1110_b = 254_d$ | C |
| $1,1111,1111_b = 511_d$ | $1111,1111_b = 255_d$ | not successful | $1,1111,1111_b = 511_d$ | $1111,111 1_b = 255_d$ | no comparison result |
| $10,0000,0000_b = 512_d$ | $0_b = 0_d$ | not successful | $1,1111,1111_b = 511_d$ | $1111,1111_b = 255_d$ | no comparison result |
| $10,0000,0001_b = 513_d$ | $1_b = 1_d$ | successful | Comparison: $1,1111,1111_b = 511_d$ Synchronization: $1,0000,0001_b + 1,0000,0000_b = 10,0000,0001_b = 257_d + 2^8{}_d = 513_d$ | Comparison: $1111,1111_b = 255_d$ | B |
| $10,0000,0010_b = 514_d$ | $10_b = 2_d$ | successful | $10,0000,0010_b = 514_d$ | $10_b = 2_d$ | C |
| $10,0000,0011_b = 515_d$ | $11_b = 3_d$ | not successful | $10,0000,0011_b = 515_d$ | $11_b = 3_d$ | no comparison result |
| $10,0000,0100_b = 516_d$ | $100_b = 4_d$ | successful | Comparison: $10,0000,0011_b = 515_d$ Synchronization: $10,0000,0100_b = 516_d$ | Comparison: $11_b = 3_d$ | A |

In line 1, the transmission of the data packet from the transmitter to the receiver is successful, which is why the comparison between the receiver and the transmitter partial counters provides the comparison result A. Then, on the transmitter side, the transmitter counter is incremented. Lastly, on the receiver side, the receiver counter is incremented because a data packet has been received. If no data packet is received, then the receiver counter is not incremented. The incremented counters are only displayed in the respective following line, here line 2.

The transmission is also successful in line 2, which is why the same as in line 1 is executed.

In line 3 the transmission is not successful because a data packet is sent by the transmitter but not received by the receiver.

The transmission was successful in line 8. The transmitter counter has the value $516_d$ and the transmitter partial counter has the value $4_d$. Due to the previous unsuccessful transmission, the receiver counter has only the value $515_d$ and the receiver partial counter has the value $3_d$. Therefore, the comparison returns the comparison result A. The receiver counter is synchronized with the transmitter counter by replacing the lowest value 8 bits of the receiver counter ($0000,0011_b$) with the transmitter partial counter ($0000,0100_b$). Then, on the transmitter side, the transmitter counter is incremented. Finally, on the receiver side, the receiver counter is incremented since a data packet has been received.

Compared to the method known from the prior art, the method according to the invention has the advantage that the transmitter counter no longer has to be transmitted in the data packet for synchronization of the receiver and transmitter initialization vectors, but a smaller transmitter partial counter is sufficient. This reduces the size of the data packet and reduces the energy required to transmit the data packet. This is particularly true with respect to methods of the prior art running on other application levels. Also, the method ensures synchronization after unsuccessful transmissions.

There is a possibility that the transmission of more than $2^M$ data packets is not successful. In this case, decryption is initially unsuccessful. Therefore, in one design of the method, the receiver first checks whether the decryption is successful. If decryption is not successful, the receiver increments the value of the counter of the receiver initialization vector by another $2^M$ and then decrypts the message again according to the encryption method using the key and the receiver initialization vector.

The key and initialization vector must be provided to the transmitter and receiver. In one design of the method, the key and the initialization vector are generated by an initializer and provided to the transmitter and the receiver. For example, the initializer is another device in addition to the transmitter and the receiver. Alternatively, the initializer is implemented, for example, in the transmitter or in the receiver, and the exchange of the key and/or the initialization vector between the transmitter and the receiver is performed according to a public key method.

In one design of the method, the encryption method implements an Advanced Encryption Standard. Advanced Encryption Standard is abbreviated as AES.

In one design of the method, the transmitter generates, on the one hand, a message authentication code for the message to ensure authenticity and/or integrity of the message and, on the other hand, the data packet with the message authentication code. Accordingly, authenticity and/or integrity of the message is/are verified by the receiver by evaluating the message authentication code. For this reason, the data packet according to this embodiment also has the message authentication code in addition to the message and the transmitter partial counter. This is also referred to as the message authentication code and is abbreviated as MAC.

In an alternative design to the above design, a message authentication code for the message and the transmitter partial counter for ensuring authenticity and/or integrity of the message and the transmitter partial counter, on the one hand, and the data packet with the message authentication code, on the other hand, are generated by the transmitter. Accordingly, authenticity and/or integrity of the message and the transmitter partial counter is or are verified by the receiver by evaluating the message authentication code. In contrast to the above design, the message authentication code is generated in this design not only for the message, but also for the message and the transmitter partial counter together. This not only ensures that tampering with the message is detected, but also that tampering with the transmitter partial counter is detected.

In a further development of the above two alternative designs, a CCM mode or a GCM mode, preferably using an AES, is implemented by the transmitter and the receiver to generate and verify the message authentication code.

A CCM mode is a mode of operation for a block cipher, which turns it into an authenticated encryption method that ensures confidentiality and integrity of a message. A CCM mode combines a counter mode for encryption with a CBC MAC mode for ensuring integrity. A counter mode is a mode of operation of a block cipher in which it generates a stream cipher. A CBC MAC mode provides for a cipher block chaining mode, abbreviated as CBC mode, to be used to ensure integrity of a message by setting its initialization vector to zero and adding the last block encrypted in CBC mode, or a portion thereof, as a MAC to the data packet.

A GCM mode is a mode of operation in which a block cipher can be operated for symmetric encryption of a message. This provides an authenticated encryption method for messages that ensures both authenticity and confidentiality. GCM mode stands for Galois counter mode.

In one design of the method, the initialization vector is generated with a nonce to improve the assurance of confidentiality or authenticity and integrity. A nonce is a character combination that is as random as possible. Accordingly, in this design, the initialization vector has the nonce in addition to the counter. The nonce in the initialization vector makes precomputation attacks more difficult. After initializing the transmitter and receiver initialization vectors with the initialization vector, both initialization vectors also have the nonce.

In one design of the method, a radio technology, preferably Bluetooth low energy, is used to transmit data packets from the transmitter to the receiver. Bluetooth low energy is described in a Bluetooth specification, for example in a Bluetooth 5 specification. Bluetooth low energy is abbreviated as BLE. This design is particularly advantageous because one goal of BLE is to transmit data packets using as little energy as possible, and the method reduces the energy required compared to the prior art.

BRIEF DESCRIPTION OF THE DRAWINGS

In detail, a multitude of possibilities are provided for designing and further developing the method. For this, reference is made to the following description of a preferred embodiment in conjunction with FIG. 1.

FIG. 1 shows a transmitter 1 and a receiver 2. Only the transmitter 1 and the receiver 2 are devices, i.e., have a physical form. The remaining components do not have a physical form. They are therefore virtual. The illustration of the virtual components serves only to illustrate the method described below for synchronizing a receiver initialization vector 3 of the receiver 2 with a transmitter initialization vector 4 of the transmitter 1 during continuous transmission of encrypted data packets from the transmitter 1 to the receiver 2.

DETAILED DESCRIPTION

First, a key 5 and an initialization vector are generated. The initialization vector has a nonce 6 with 64 bits and a counter with N=16 bits. Then, the key 5 is provided to both the transmitter 1 and the receiver 2 so that the key is used by the transmitter 1 and the receiver 2. Further, the receiver initialization vector 3 and the transmitter initialization vector 4 are initialized with the initialization vector. After initialization, the receiver initialization vector 3 has the nonce 6 and a receiver counter 7, and the transmitter initialization vector 4 has the nonce 6 and a transmitter counter 8. The receiver counter 7 and the transmitter counter 8 are each 16-bit counters that have the same value after initialization.

The following steps are performed by the transmitter 1:
A transmitter partial counter 9 is formed with the lowest value M=8 bits less than N=16 bits from the transmitter counter 8. Accordingly, the transmitter partial counter 9 is an 8-bit counter.

A message 10 is encrypted according to an encryption method using the key 5 and the transmitter initialization vector 4 to ensure confidentiality.

For this, the message 10, the key 5 and the transmitter initialization vector 4 are read. The encryption process implements an AES.

A message authentication code 12 is generated for the message 10 to ensure authenticity and integrity of the message 10. A CCM mode is implemented for generation.

A data packet 11 is generated and transmitted with the encrypted message 10, the transmitter partial counter 9, and the message authentication code 12.

The transmitter counter 8 is then incremented.

The following steps are performed by the receiver 2:

0. The data packet 11 containing encrypted message 10, transmitter partial counter 9, and message authentication code 12 is received.

The transmitter partial counter 9 is extracted from the data packet 11.

A receiver partial counter 13 is formed with the lowest value M=8 bits less than N=16 bits from the receiver counter 7. The receiver partial counter 13 is therefore an 8-bit counter.

A comparison is made between the receiver partial counter 13 and the transmitter partial counter 9.

If the comparison results in a higher transmitter partial counter 9 than receiver partial counter 13, then the lowest value M=8 bits of receiver partial counter 7 are replaced by the transmitter partial counter 9.

If the comparison results in a lower transmitter partial counter 9 than receiver partial counter 13, then the lowest value M=8 bits of the receiver partial counter 7 are replaced by the transmitter partial counter 9 and then the value of the receiver partial counter 7 is increased by $2^M=28$.

0. Authenticity and integrity of the message 10 are verified by evaluating the message authentication code 12.

The message 10 is decrypted according to the encryption method using the key 5 and the receiver initialization vector 3. For this, the key 5 is read. The decrypted message 10 is output. Then the receiver counter 7 is incremented.

The last two steps occur after ensuring that the receiver and transmitter initialization vectors match. Transmission of the data packet 11 from the transmitter 1 to the receiver 2, i.e. transmission and reception, takes place using Bluetooth low energy.

The invention claimed is:

1. A method for synchronizing a receiver initialization vector of a receiver with a transmitter initialization vector of a transmitter during continuous transmission of encrypted data packets from the transmitter to the receiver, comprising:
   generating a key;
   generating an initialization vector with a counter with N bits;
   providing the key to the transmitter and the receiver;
   initializing the transmitter initialization vector and the receiver initialization vector with the initialization vector;
   forming a transmitter partial counter with the lowest value M bits less than N bits from the counter of the transmitter initialization vector;
   encrypting a message according to an encryption method using the key and the transmitter initialization vector to ensure confidentiality;
   generating and transmitting a data packet containing the encrypted message and the transmitter partial counter;
   thereafter incrementing the counter of the transmitter initialization vector;
   after the step of generating and transmitting the data packet, receiving the data packet at the receiver;
   after the step of receiving the data packet, extracting the transmitter partial counter from the data packet;
   forming a receiver partial counter with the lowest value M bits less than N bits from the counter of the receiver initialization vector;
   after the steps of extracting the transmitter partial counter and forming the receiver partial counter, performing a comparison between the receiver partial counter and the transmitter partial counter;
   when the comparison results in a higher transmitter partial counter than receiver partial counter, replacing the lowest value M bits of the counter of the receiver initialization vector by the transmitter partial counter;
   when the comparison results in a lower transmitter partial counter than receiver partial counter, replacing the lowest value M bits of the counter of the receiver initialization vector by the transmitter partial counter, and increasing the value of the counter of the receiver initialization vector by $2^M$; and
   thereafter decrypting the message according to the encryption method using the key and the receiver initialization vector, and then incrementing the counter of the receiver initialization vector,
   wherein M is an integer that is greater than 0, and wherein N is an integer that is greater than 1.

2. The method according to claim 1, further comprising:
   checking, by the receiver, whether the decryption is successful; and
   when the decryption is not successful, increasing the value of the counter of the receiver initialization vector by another $2^M$, and decrypting the message again according to the encryption method using the key and the receiver initialization vector.

3. The method according to claim 1, wherein the key and the initialization vector are generated by an initializer and provided to the transmitter and the receiver.

4. The method according to claim 1, wherein the encryption method implements an Advanced Encryption Standard.

5. The method according to claim 1, further comprising:
   generating a message authentication code for the message by the transmitter to ensure authenticity and/or integrity of the message;
   wherein the step of generating and transmitting the data packet involves generating the data packet with the message authentication code; and
   after the step of receiving the data packet at the receiver, checking authenticity and/or integrity of the message by the receiver by evaluating the message authentication code.

6. The method according to claim 5, wherein a CCM or a GCM mode is implemented by the transmitter and the receiver for generating and checking the message authentication code.

7. The method according to claim 1, further comprising:
   generating a message authentication code for the message and the transmitter partial counter for ensuring authenticity and/or integrity of the message and of the transmitter partial counter;
   wherein the step of generating and transmitting the data packet involves generating the data packet with the message authentication code; and checking authenticity and/or integrity of the message and of the transmitter partial counter by the receiver by evaluating the message authentication code.

8. The method according to claim 1, wherein the initialization vector is generated with a nonce in order to improve the assurance of confidentiality or authenticity and integrity.

9. The method according to claim 1, wherein a radio technology is used to transmit data packets from the transmitter to the receiver.

10. The method according to claim 9, wherein the radio technology is Bluetooth Low Energy.

* * * * *